US010750239B2

(12) United States Patent
Sanchesshayda et al.

(10) Patent No.: US 10,750,239 B2
(45) Date of Patent: Aug. 18, 2020

(54) SERVER APPARATUS AND METHOD FOR CONTROLLING SAME

(71) Applicant: SAMSUNG ELECTRONICS CO., LTD., Suwon-si, Gyeonggi-do (KR)

(72) Inventors: Ernesto Evgeniy Sanchesshayda, Moscow (RU); Vivek Agarwal, Suwon-si (KR); Jatin Garg, Suwon-si (KR); Min-suk Song, Suwon-si (KR); Jae-ook Kwon, Yongin-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/328,055

(22) PCT Filed: Jul. 4, 2017

(86) PCT No.: PCT/KR2017/007059
§ 371 (c)(1),
(2) Date: Feb. 25, 2019

(87) PCT Pub. No.: WO2018/038384
PCT Pub. Date: Mar. 1, 2018

(65) Prior Publication Data
US 2019/0200076 A1    Jun. 27, 2019

(30) Foreign Application Priority Data
Aug. 26, 2016 (KR) .................. 10-2016-0109159

(51) Int. Cl.
*H04N 7/10* (2006.01)
*H04N 21/442* (2011.01)
(Continued)

(52) U.S. Cl.
CPC ....... *H04N 21/44222* (2013.01); *H04N 21/25* (2013.01); *H04N 21/258* (2013.01);
(Continued)

(58) Field of Classification Search
CPC ............ H04N 21/44222; H04N 21/25; H04N 21/466; H04N 21/45; H04N 21/258;
(Continued)

(56) References Cited

U.S. PATENT DOCUMENTS 7,757,250 B1   7/2010   Horvitz et al.
8,046,797 B2   10/2011  Bentolila et al.
(Continued)

FOREIGN PATENT DOCUMENTS

JP    2003-018584    1/2003
JP    5450051        3/2014
(Continued)

OTHER PUBLICATIONS

International Search Report for PCT/KR2017/007059 dated Nov. 2, 2017, 4 pages.
(Continued)

*Primary Examiner* — Michael B. Pierorazio
(74) *Attorney, Agent, or Firm* — Nixon & Vanderhye, P.C.

(57) ABSTRACT

Disclosed is a server apparatus. The server apparatus comprises: a communication unit for receiving, from an external server, multiple first viewing log data for each of a plurality of first users using a first broadcast receiving apparatus and multiple user information of each of the plurality of first users; and a processor for updating a predictive model for predicting, from the viewing log data, the number of users using the broadcast receiving apparatus and user information of each of the users, on the basis of the received multiple first viewing log data and the received multiple user information, wherein, when second viewing log data is received from a second broadcast receiving apparatus through the communication unit, the processor predicts, using the updated predictive model, the number of users using the second
(Continued)

broadcast receiving apparatus and user information of each of the users.

15 Claims, 9 Drawing Sheets (51) Int. Cl.
*H04N 21/258* (2011.01)
*H04N 21/45* (2011.01)
*H04N 21/466* (2011.01)
*H04N 21/25* (2011.01)

(52) U.S. Cl.
CPC ........... *H04N 21/442* (2013.01); *H04N 21/45* (2013.01); *H04N 21/466* (2013.01); *H04N 21/4666* (2013.01)

(58) Field of Classification Search
CPC ............. H04N 21/442; H04N 21/4666; H04N 21/25891; H04N 21/25883; H04N 21/252; H04N 21/6582
USPC .......................................................... 725/14
See application file for complete search history.

(56) References Cited

U.S. PATENT DOCUMENTS

| | | | |
|---|---|---|---|
| 8,510,770 B1 * | 8/2013 | Oztaskent | H04L 67/22 |
| | | | 705/319 |
| 8,781,897 B2 | 7/2014 | McKay | |
| 8,799,936 B2 | 8/2014 | Choi | |
| 9,269,047 B2 * | 2/2016 | Kumar | G06N 5/047 |
| 9,392,334 B2 * | 7/2016 | Cox | H04N 21/4826 |
| 9,571,881 B1 * | 2/2017 | Rasool | G11B 27/34 |
| 9,576,473 B2 * | 2/2017 | Navin | H04N 21/8358 |
| 9,596,512 B2 * | 3/2017 | Garcia Navarro | |
| | | | H04N 21/4668 |
| 9,712,869 B1 * | 7/2017 | Arini | H04N 21/4661 |
| 9,807,447 B2 * | 10/2017 | Webster | H04N 21/4334 |
| 9,961,387 B2 * | 5/2018 | Uhm | H04N 21/252 |
| 9,967,619 B2 * | 5/2018 | Oztaskent | G06Q 30/0246 |
| 10,257,572 B2 * | 4/2019 | Manus | G06N 20/00 |
| 10,341,703 B1 * | 7/2019 | Shen | H04N 21/2407 |
| 10,405,027 B2 * | 9/2019 | Elbert | H04N 21/4334 |
| 2003/0101451 A1 | 5/2003 | Bentolila et al. | |
| 2007/0271580 A1 * | 11/2007 | Tischer | H04H 60/07 |
| | | | 725/35 |
| 2009/0024546 A1 | 1/2009 | Ficcaglia et al. | |
| 2012/0278330 A1 | 11/2012 | Campbell et al. | |
| 2013/0246164 A1 | 9/2013 | Khanna | |
| 2013/0263168 A1 | 10/2013 | Choi | |
| 2014/0280879 A1 | 9/2014 | Skolicki | |

FOREIGN PATENT DOCUMENTS

| | | |
|---|---|---|
| KR | 10-0889987 | 3/2009 |
| KR | 10-2012-0003362 | 1/2012 |
| KR | 10-1495297 | 2/2015 |
| WO | 00/33233 | 6/2000 |
| WO | 2007/126903 | 11/2007 |

OTHER PUBLICATIONS

Written Opinion of the ISA for PCT/KR2017/007059 dated Nov. 2, 2017, 11 pages, with English Translation.

* cited by examiner

SERVER APPARATUS AND METHOD FOR CONTROLLING SAME

This application is the U.S. national phase of International Application No. PCT/KR2017/007059 filed Jul. 4, 2017 which designated the U.S. and claims priority to KR Patent Application No. 10-2016-0109159 filed Aug. 26, 2016, the entire contents of each of which are hereby incorporated by reference.

TECHNICAL FIELD

Devices and methods consistent with what is disclosed herein relate to a server apparatus and a controlling method thereof, and more particularly, to a server apparatus capable of predicting user information on each of a plurality of users and a controlling method thereof.

DESCRIPTION OF RELATED ART

A technique for providing a personalization service based on various information has been employed in various fields. A content recommendation system based on a purchase pattern of a user could be an example. Apart from that, various recommendation techniques have been suggested such as a technique for recommending a content by training behavior details of a content item user, a technique for recommending a media list according to a TV viewer, a technique for recommending based on local information and user's content usage log, a technique for recommending based on social-network and profiling filtering, etc.

However, a conventional recommendation technique provides a recommendation service by using static or fragmentary information. In other words, in order to provide a recommendation service, a user may need to directly provide user information to be used for recommendation.

However, it is not easy to recommend appropriate contents for a user since the amount of user information is very small or unreliable, and also it costs a lot to collect. Specifically, in the case of a home TV, if the same server apparatus is used by a plurality of users, it is difficult to recommend and provide a content corresponding to each of a plurality of users.

Accordingly, a technique for accurately performing profiling with respect to each of a plurality of users sharing a server apparatus has been required.

SUMMARY

One technical task of the present disclosure is to provide a server apparatus for predicting user information on each of a plurality of users by using a usage history of a broadcast receiving apparatus, and a controlling method thereof.

According to an embodiment, there is provided a server apparatus including a communicator configured to receive a plurality of first viewing log data with respect to a plurality of respective first users using a first broadcast receiving apparatus, and a plurality of pieces of user information on the plurality of respective first users from an external server, and a processor configured to, based on the received plurality of first viewing log data and the received plurality of pieces of user information, renew a predictive model which predicts a number of users using a broadcast receiving apparatus and user information on each user from viewing log data, wherein the processor is further configured to, based on second viewing log data being received from a second broadcast receiving apparatus through the communicator, predict a number of users using the second broadcast receiving apparatus and user information on each user by using the renewed predictive model.

The processor may be further configured to retrieve content information corresponding to the predicted number of users and the predicted user information, and control the communicator to transmit the retrieved content information to the second broadcast receiving apparatus.

The processor may be further configured to retrieve content information corresponding to the predicted user information on each user, and control the communicator to transmit common content information among the retrieved content information to the second broadcast receiving apparatus.

The processor may be further configured to predict the number of users using the second broadcast receiving apparatus and the user information on each user for each time period.

The processor may be further configured to retrieve content information corresponding to the user information predicted for each time period, and control the communicator to transmit the retrieved content information to the second broadcast receiving apparatus.

The processor may be further configured to arrange the received plurality of first viewing log data in a time sequence, predict a number of users using the first broadcast receiving apparatus and user information on each user based on the arranged viewing log data by using the predictive model, and modify the predictive model by comparing the received plurality of pieces of user information on the plurality of respective first users with the predicted user information.

The processor may be further configured to modify the predictive model and the predicted user information approximates the received plurality of pieces of user information on the plurality of respective first users.

The predictive model may include at least one of a recurrent neural network, a fully connected network, and a convolutional neural network.

The user information may include at least one of gender, age, income level, and education level of a user.

The first viewing log data and the second viewing log data may be at least one of a viewed channel, a channel change time, a volume control time, and a power on/off time of the server apparatus.

According to an embodiment, there is provided a method for controlling a server apparatus, the method including receiving a plurality of first viewing log data with respect to a plurality of respective first users using a first broadcast receiving apparatus, and a plurality of pieces of user information on the plurality of respective first users from an external server, renewing a predictive model which predicts a number of users using a broadcast receiving apparatus and user information on each user from viewing log data based on the received plurality of first viewing log data and the received plurality of pieces of user information, and predicting a number of users using a second broadcast receiving apparatus and user information on each user by using the renewed predictive model based on second viewing log data being received.

The method may further include retrieving content information corresponding to the predicted number of users and the predicted user information, and transmitting the retrieved content information to the second broadcast receiving apparatus.

The retrieving may include retrieving content information corresponding to the predicted user information on each user, and wherein the transmitting includes transmitting common content information among the retrieved content information to the second broadcast receiving apparatus.

The predicting may include predicting the number of users using the second broadcast receiving apparatus and the user information on each user for each time period.

The method may further include retrieving content information corresponding to the user information predicted for each time period, and transmitting the retrieved content information to the second broadcast receiving apparatus.

The renewing may include arranging the received plurality of first viewing log data in a time sequence, predicting a number of users using the first broadcast receiving apparatus and user information on each user by using the predictive mode based on the arranged viewing log data, and modifying the predictive model by comparing the received plurality of pieces of user information on the plurality of respective first users with the predicted user information.

The modifying may include modifying the predictive model and the predicted user information approximates the received plurality of pieces of user information on the plurality of respective first users.

The predictive model may include at least one of a recurrent neural network, a fully connected network, and a convolutional neural network.

The first viewing log data and the second viewing log data may be at least one of a viewed channel, a channel change time, a volume control time, and a power on/off time of the server apparatus.

DETAILED DESCRIPTION OF EXAMPLE EMBODIMENTS

Hereinafter, the present disclosure will be described in detail with reference to the drawings. In the following description, the configuration which is publicly known but irrelevant to the gist of the present disclosure could be omitted. In addition, the following embodiments may be modified into various other forms, and the scope of the technical spirit of the present disclosure is not limited to the following examples. Rather, these embodiments are provided so that the present disclosure will be more thorough and complete, and will fully convey the scope of the technical spirit of the present disclosure to those skilled in the art.

When an element is referred to as "including" a component, this indicates that the element may further include another component instead of excluding another component unless there is different disclosure. Further, various elements and regions in the drawings are schematically drawn. Accordingly, the technical spirit of the present disclosure is not limited by the relative size or spacing illustrated in the accompanying drawings.

Figure 1:
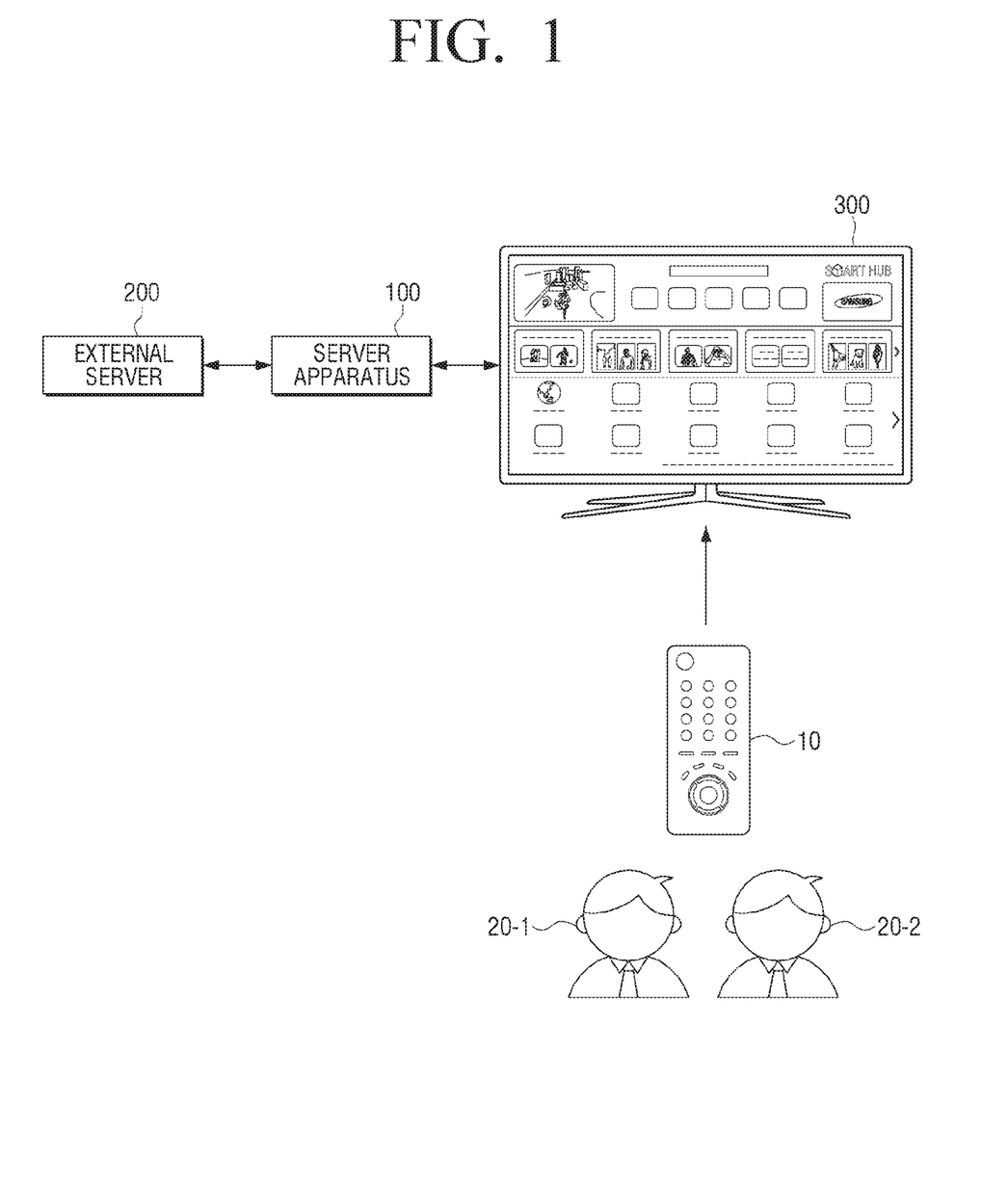
FIG. 1 is a view illustrating configuration of a user profiling system using a server apparatus according to an embodiment of the present disclosure.

FIG. 1 is a view illustrating configuration of a user profiling system using a server apparatus according to an embodiment of the present disclosure.

Referring to FIG. 1, a user profiling system 100 according to an embodiment of the present disclosure may include a server apparatus 100, an external apparatus 200, and a broadcast receiving apparatus 300.

The server apparatus 100 may renew a pre-stored predictive model based on a plurality of first viewing log data with respect to a plurality of first users using a first broadcast receiving apparatus, and a plurality of pieces of user information on a respective plurality of users received from the external apparatus 200. The server apparatus 100 may predict user information. The server apparatus 100, based on second viewing log data being received from a second broadcast receiving apparatus, may predict the number of users using a second broadcast receiving apparatus and user information on each user by using the renewed predictive model.

The predictive model may be a model for explaining a relationship of an independent variable and a dependent variable, or a relationship of input to output. Input, output, and performance functions are well known, but internal implementation is not known, or it is not specified, and the predictive model is referred to as a black box model. Specifically, the predictive model may predict the number of users using a broadcast receiving apparatus and user information on each user based on viewing log data.

Examples of the predictive model may include a recurrent neural network, a fully connected network, a convolutional neural network, etc. The above-described types of predictive models are well known in the art, and thus the detailed description thereof will be omitted.

The detailed configuration of the server apparatus 100 will be described in detail with reference to FIGS. 2 and 3.

The server apparatus 100 may receive viewing log data with respect to a plurality of users using a plurality of broadcast receiving apparatuses and user information on the plurality of users from the external server 200, predict user information on the plurality of users by using the received viewing log data, and modify the predictive model by comparing the predicted user information with the received user information. To be specific, the server apparatus 100 may modify the predictive model by changing a parameter of the predictive model.

The server apparatus 100 may be a server connected to the external server 200 and the broadcast receiving apparatus 300. For ease of explanation, the server apparatus 100 and the broadcast receiving apparatus 300 are illustrated as separate configurations, but at the time of implementation, the server apparatus 100 and the broadcast receiving apparatus 300 could be integrated. When the server apparatus 100 and the broadcast receiving apparatus 300 are integrated, the server apparatus 100 connected to the external apparatus 200 could be various display apparatuses such as mobile devices such as smart phones, laptops, tablet PCs, smart TVs, desktop PCs, etc. For ease of explanation, it is assumed that the server apparatus 100 and the broadcast receiving apparatus 300 are separated.

The external server 200 may provide viewing log data with respect to a plurality of users respectively using a plurality of broadcast receiving apparatuses connected to the external apparatus 200 and user information on the plurality of users to the server apparatus 100. To be specific, the external apparatus 200 may generate viewing log data with respect to each of the plurality of broadcast receiving apparatuses, and each of the plurality of users respectively using the plurality of broadcast receiving apparatuses.

The viewing log data may include a viewed channel, a channel change time, a volume control time, a power on/off time of a server apparatus, a usage time of a server apparatus, etc. and further include a favorite TV channel, a favorite TV program, a content purchase history, a service usage history, etc. In addition, the user information may include personal information on a user, for example, gender, age, income level, residence area, education level, generation structure, etc.

The external server 200 may belong to at least one of a public agency, a government, a market research institute, a survey agency, and a corporation. Therefore, the viewing log data and user information provided by the external apparatus 200 may be open data or requires a predetermined cost.

The broadcast receiving apparatus 300 may transmit viewing log data with respect to the broadcast receiving apparatus 300 to the server apparatus 100. The viewing log data for the broadcast receiving apparatus 300 may not include personal information on a user such as the number of users, and may be a time-ordered history of a user's use of the broadcast receiving apparatus 300. To be specific, the broadcast receiving apparatus 300 may include an apparatus that can be shared by a plurality of users such as smart phones, laptops, desktop PCs, tablet PCs, smart TVs, set-top boxes, etc.

The viewing log data transmitted from the broadcast receiving apparatus 300 to the server apparatus 100 may include a viewed channel, a channel change time, a volume control time, a power on/off time of a server apparatus, a usage time of a server apparatus, etc. and further include a favorite TV channel, a favorite TV program, a content purchase history, a service usage history, etc.

It is illustrated that viewing log data on the broadcast receiving apparatus 300 is transmitted from the broadcast receiving apparatus 300 to the server apparatus 100. At the time of implementation, the server apparatus 100 may transmit user information including unknown information on at least one item of at least one user using the broadcast receiving apparatus 300. The server apparatus 100 may predict unknown information using the renewed predictive model.

Figure 2:
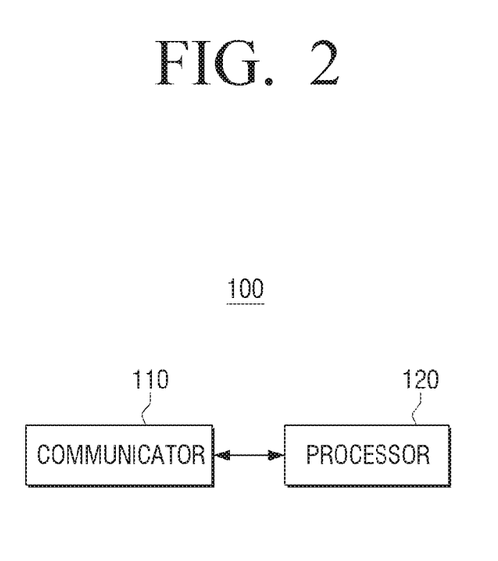
FIG. 2 is a schematic block diagram showing configuration of a server apparatus according to an embodiment of the present disclosure.

FIG. 2 is a schematic block diagram showing configuration of a server apparatus according to an embodiment of the present disclosure.

Referring to FIG. 2, a server apparatus 100 according to an embodiment of the present disclosure may include a communicator 110 and a processor 120.

The communicator 110 may receive a plurality of first viewing log data with respect to a plurality of first users using a first broadcast receiving apparatus and a plurality of pieces of user information on the respective plurality of first users from an external server. To be specific, the communicator 110 may receive viewing log data with respect to each of the plurality of users using the plurality of broadcast receiving apparatuses and user information consisting of a plurality of items with respect to the plurality of users from the external server.

When a broadcast receiving apparatus connected to an external server includes a plurality of broadcast receiving apparatuses, viewing log data may be generated for each of the plurality of broadcast receiving apparatuses, and viewing log data with respect to each of the plurality of broadcast receiving apparatuses may be generated by classifying the usage history for each of the plurality of users respectively using the plurality of broadcast receiving apparatus. A method for generating viewing log data with respect to each of the plurality of users using the plurality of broadcast receiving apparatuses will be described in detail with reference to FIG. 6.

The communicator 110 may receive viewing log data on a second broadcast receiving apparatus from the second broadcast receiving apparatus connected to the server apparatus 100 in addition to the plurality of first broadcast receiving apparatuses connected to the external server. To be specific, the viewing log data with respect to the second broadcast receiving apparatus may be the time-ordered history of a user's use of the second broadcast receiving apparatus, but personal information such as the number of users using the second broadcast receiving apparatus, the gender and age of the user may not be known.

The personal information on the user may be predicted by the processor 120 based on the received viewing log data for the second broadcast receiving apparatus. The user information prediction will be described in detail with reference to the description of the processor 120 and FIG. 8.

The communicator 110 may transmit the retrieved content corresponding to at least one user using the second broadcast receiving apparatus to the second broadcast receiving apparatus based on the user information predicted based on the viewing log data on the second broadcast receiving apparatus by the processor 120. The communicator 110 may transmit the user information predicted by the processor 120 to the second broadcast receiving apparatus.

The processor 120 may renew the predictive model by using the first viewing log data for the plurality of first users using the plurality of first broadcast receiving apparatuses and user information on each of the plurality of first users received from the external server through the communicator 110.

The processor 120 may arrange the plurality of first viewing log data received from the external server through the communicator 110 in a time sequence. The processor 120 may arrange the first viewing log data on the plurality of first users using at least one first broadcast receiving apparatus among the plurality of first broadcast receiving apparatuses for each broadcast receiving apparatus in a time sequence. The detailed description thereof will be made below with reference to FIG. 7.

The processor 120 may predict at least one item of the user information on the plurality of first users using the plurality of first broadcast receiving apparatuses. The processor 120 may predict user information on each of the plurality of first users using the first broadcast receiving apparatus based on the first viewing log data arranged by using the predictive model predicting the number of users using the broadcast receiving apparatus and user information based on viewing log data. To be specific, the processor 120 may predict at least one of a plurality of items constituting user information on each of the plurality of first users.

The processor 120 may modify the predictive model by comparing the plurality of pieces of user information on the respective plurality of first users received through the communicator 110 with the predicted user information. The processor 120 may modify the predictive model so that the predicted user information approximates the received user information on each of the plurality of first users.

The processor 120, based on the second viewing log data being received from the second broadcast receiving apparatus through the communicator 110, predict the number of users using the second broadcast receiving apparatus and the user information on each user by using the renewed predictive model.

The processor 120 may retrieve the predicted content information corresponding to the number of users using the second broadcast receiving apparatus and user information on each user and control the communicator 110 to transmit the content information to the second broadcast receiving apparatus.

When it is predicted that there are a plurality of users using the second broadcast receiving apparatus, the processor 120 may retrieve content information corresponding to the predicted user information on each user, and control the communicator 110 to transmit common content information among the retrieved content information corresponding to each user to the second broadcast receiving apparatus.

The processor 120 may predict the number of users using the second broadcast receiving apparatus and user information on each user for each time period. To be specific, the processor 120 may predict the number of users using the second broadcast receiving apparatus and user information on each user by using the renewed predictive model based on the second viewing log data generated for each time period.

The processor 120 may retrieve a content corresponding to the user information predicted for each time period based on the user information predicted for each time period and control the communicator 110 to transmit the content to the second broadcast receiving apparatus.

According to various embodiments as described above, the number of users using the broadcast receiving apparatus and user information on each user may be accurately predicted, and more appropriate content may be provided for each time period depending on the user based on the predicted user information.

Figure 3:
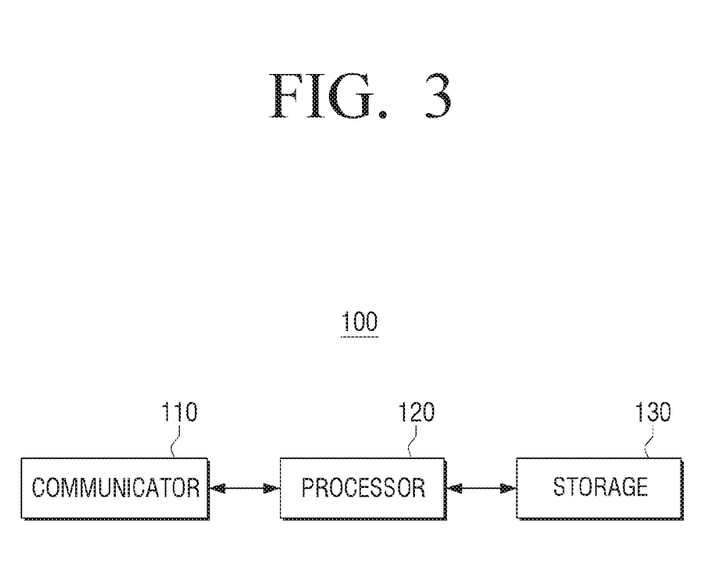
FIG. 3 is a detailed block diagram showing configuration of a server apparatus according to an embodiment of the present disclosure.

FIG. 3 is a detailed block diagram showing configuration of a server apparatus according to an embodiment of the present disclosure.

Referring to FIG. 3, a server apparatus 100 according to an embodiment of the present disclosure may include a communicator 110, a processor 120, and a storage 130.

The communicator 110 and the processor 120 are the same as those shown in FIG. 2, and thus the detailed description thereof will be omitted.

The storage 130 may store various programs and data required for the operation of the electronic apparatus 100. The storage 130 may store a control program for controlling the server apparatus 100, an application initially provided by a manufacturer, or downloaded from an external source, a graphical user interface (GUI) related to the application, an object for providing the GUI (e.g., image text, icon, button, etc.), user information, documents, database, or relevant data.

The storage 130 may store a plurality of first log data on respective first users using the first broadcast receiving apparatus, a plurality of pieces of user information on the respective first users, and the predicted user information on the second broadcast receiving apparatus, which are received from the communicator 110. The user information may include gender, age, income level, residence area, generating structure, and device usage information on the user of each of the plurality of broadcast receiving apparatuses, and the viewing log data may include service usage information, device usage time, favorite channel, favorite TV program, etc. of the broadcast receiving apparatus.

The storage 130 may store a parameter of a predictive model for predicting unknown user information based on viewing log data.

The storage 130 may store the number of users using the first broadcast receiving apparatus and user information on each user predicted by the processor 120 by using the stored parameter. The storage 130 may store the predictive model renewed based on the predicted user information and the user information received from the first broadcast receiving apparatus. The storage 130 may change a parameter based on the error calculated by comparing the predicted user information with the user information received from the first broadcast receiving apparatus and store the renewed predictive model.

The storage 130, based on second viewing log data being received from the second broadcast receiving apparatus, may store the received second viewing log data, and store the number of users using the second broadcast receiving apparatus and the user information on each user which are predicted by using the renewed predictive model.

The storage 130 may store various contents. The contents may be video files such as commercials, films, TV programs, etc. that can be provided to a user on another broadcast receiving apparatus, or image files such as thumbnail images corresponding thereto.

As described above, it is illustrated that the server apparatus 100 and the second broadcast receiving apparatus are separated, but at the time of implementation, the server apparatus 100 and the second broadcast receiving apparatus could be integrated. In this case, an input unit for receiving an operating command from a user for generating second log data, a user interface screen, or a display unit for displaying a content may be further included.

Figure 4:
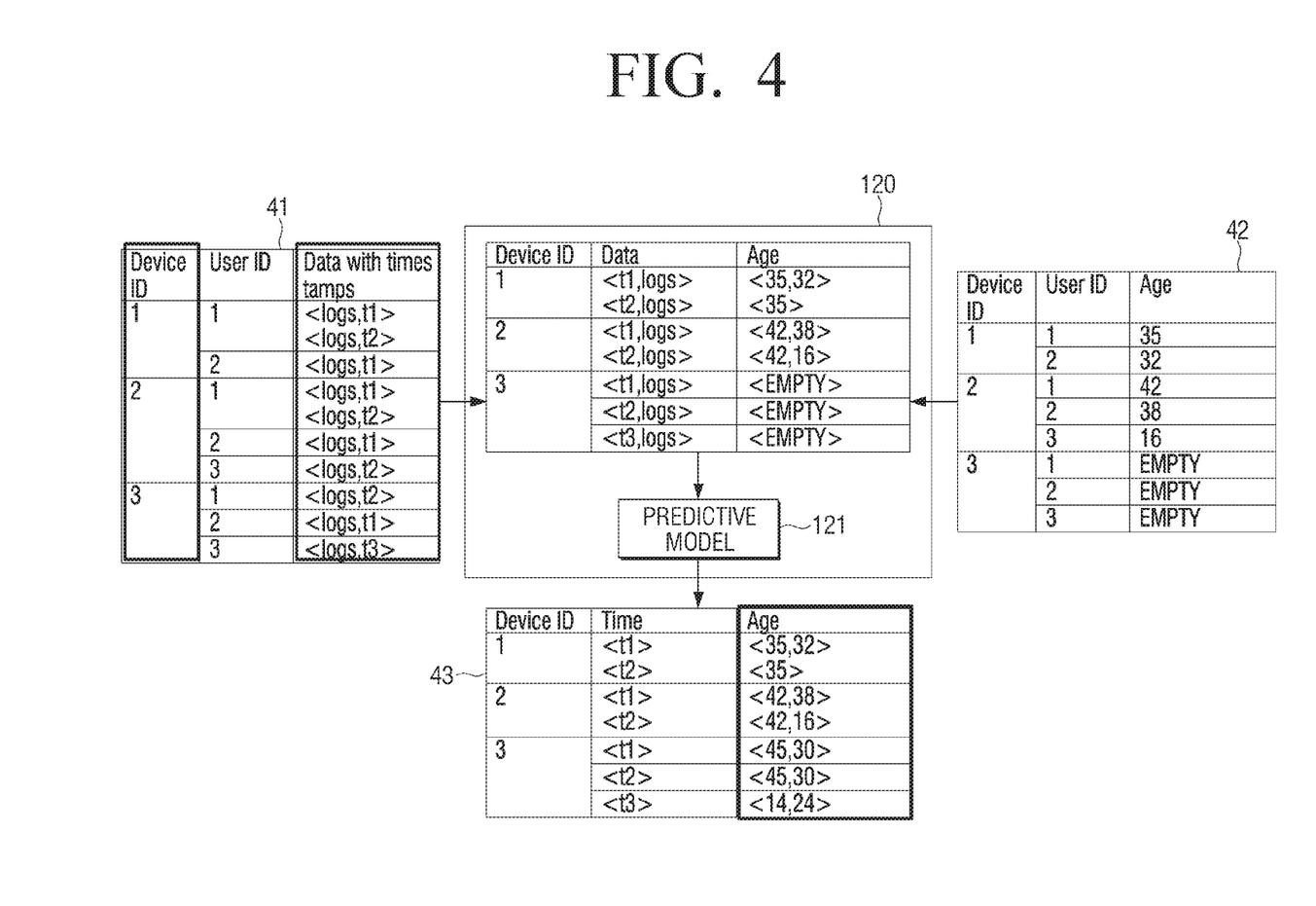
FIG. 4 is a schematic view to explain a user profiling method according to an embodiment of the present disclosure.

FIG. 4 is a schematic view to explain a user profiling method according to an embodiment of the present disclosure.

Referring to FIG. 4, the processor 120 of the server apparatus according to an embodiment of the present disclosure may obtain a plurality of first viewing log data 41 with respect to a respective plurality of first users using a first broadcast receiving apparatus, user information 42 with respect to the respective plurality of first users, and result information 43 that predicts unknown information on a user by using a predictive model 121 for performing machine training.

The processor 120 may perform profiling of user information by collecting the first viewing log data 41, and the user information 42. The first viewing log data 41 and the user information 42 used for predicting the unknown information on the user may be received from an external server, or directly received from at least one first broadcast receiving apparatus such as a smart TV or a mobile device used by a plurality of users.

The input user information 42 may include unknown information depending on whether information is input. For example, the ages of users 1 and 2 of broadcast receiving apparatus 1 (device ID:1), and the ages of users 1 to 3 of broadcast receiving apparatus 2 may be input, but the ages of users 1 to 3 of broadcast receiving apparatus 3 (device ID: 3) may not be input. Therefore, the ages of a plurality of users of broadcast receiving apparatus 3 may correspond to unknown information.

The processor 120 may predict user information on each of the plurality of first users with respect to the plurality of first broadcast receiving apparatuses by using the first viewing log data 41. To be specific, the processor 120 may generate the first viewing log data for each first broadcast receiving apparatus by arranging the plurality of first viewing log data 41 with respect to the plurality of first broadcast receiving apparatuses in a time sequence, and produce the user information 43 with respect to the respective plurality of first users by using the first viewing log data and the user information predictive model 212 for each first broadcast receiving apparatus.

The processor 120 may compare the predicted user information 43 and the received or input user information 42 to calculate the error of the predicted user information 43, and modify the predictive model 121 by changing the parameter of the predictive model 121 based thereon. The machine training process is well known in the art, and thus the detailed description will be omitted.

As described above, only the age has been exemplified for the user information 42 of the plurality of users, but at the time of implementation, gender, income level, education level, etc. may be further included as the user information.

As described above, unknown user information may be predicted more accurately by modifying the predictive model by using the plurality of first viewing log data of the plurality of first users using the first broadcast receiving apparatus and the plurality of pieces of user information.

Figure 5:
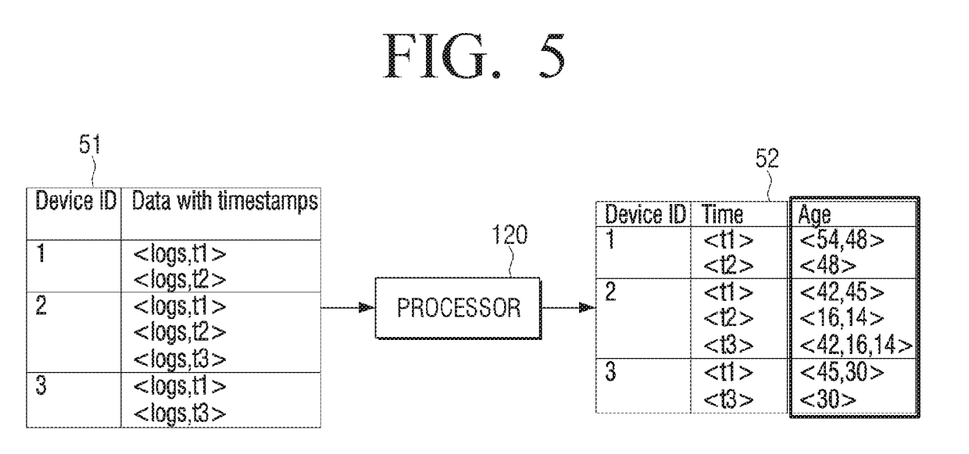
FIG. 5 is a schematic view to explain a user profiling method according to another embodiment of the present disclosure.

FIG. 5 is a schematic view to explain a user profiling method according to another embodiment of the present disclosure.

Referring to FIG. 5, the processor 120 of the server apparatus according to an embodiment of the present disclosure may obtain result information 52 that predicts unknown information on at least one user using each of the plurality of second broadcast receiving apparatuses by using the second viewing log data 51 received from the second broadcast receiving apparatus. The predicted result information 52 may include the number of users using the second broadcast receiving apparatus and user information on each user The processor 120 may predict the number of users using the second broadcast receiving apparatus and the user information 52 for each time period by using the second viewing log data 51, which is the usage history of each of the plurality of second broadcast receiving apparatuses not distinguished by the user using the second broadcast receiving apparatus. The processor 120 may obtain the predictive result information 52 by using the received or input second viewing log data 51 and the renewed predictive model. The predictive model may be a predictive model modified through machine training.

By using the modified predictive mode, although the second viewing log data, which is the usage history of the second broadcast receiving apparatus not distinguished by the user is used, the number of users using the second broadcast receiving apparatus and user information on each of at least one user may be predicted for each time period.

Figure 6:
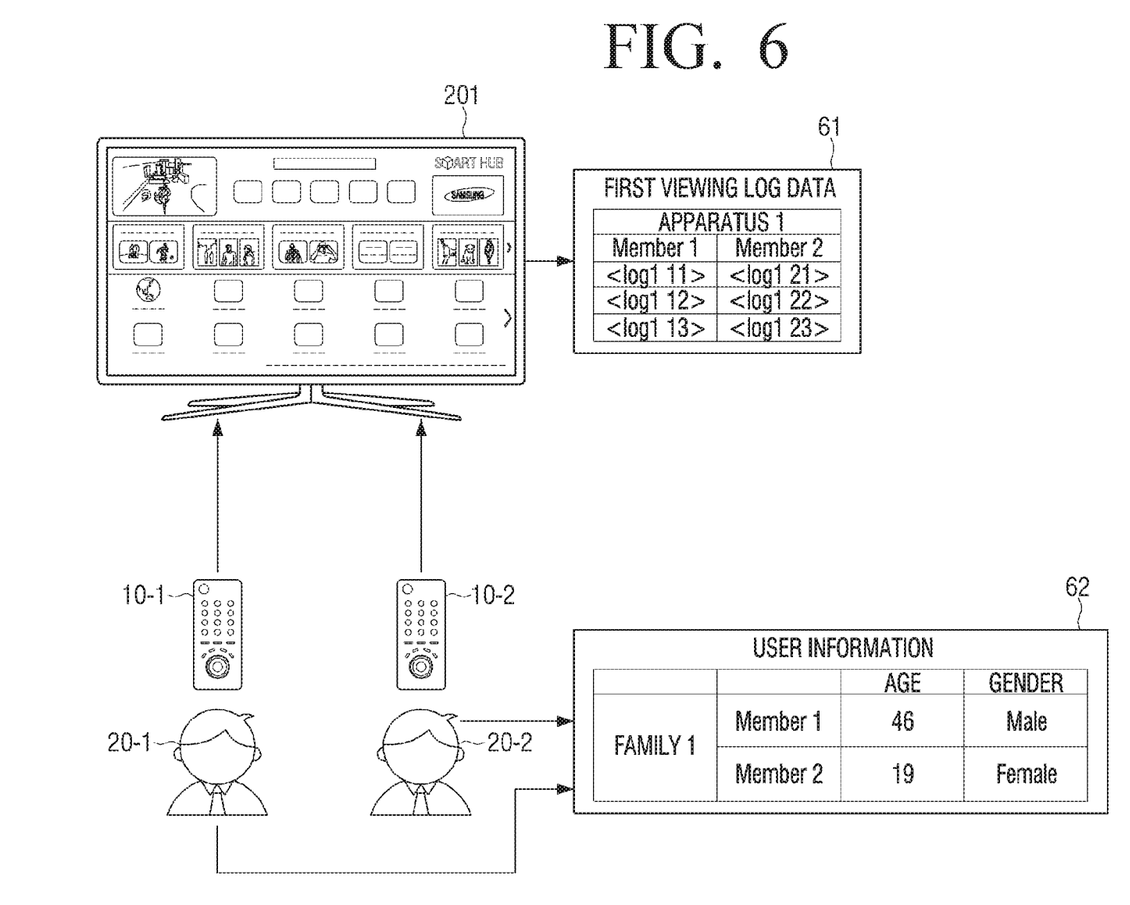
FIG. 6 is a schematic view to explain a method for collecting first viewing log data and user information from an external server.

FIG. 6 is a schematic view to explain a method for collecting first viewing log data and user information from an external server.

Referring to FIG. 6, a first broadcast receiving apparatus 201 connected to an external server (not shown) may be used by a plurality of users 20-1 and 20-2. To be specific, the first broadcast receiving apparatus 201 may receive the operation of each of the plurality of users 20-1 and 20-2 separately. For example, the plurality of users 20-1 and 20-2 may operate the first broadcast receiving apparatus 201 by using the plurality of remote controller 10-1 and 10-2 for operating the first broadcast receiving apparatus 201, respectively. However, the present disclosure is not limited thereto, but can be applied to all the methods by which the first broadcast receiving apparatus 201 can distinguish the operations of the plurality of users 20-1 and 20-2, such as the case where the ranges in which the plurality of users 20-1 and 20-2 operate using a single remote controller are different, or the case where the first broadcast receiving apparatus is operated by inputting who is the user to operate prior to the operation.

The first broadcast receiving apparatus 201 may generate first viewing log data 61, which is the usage history of the plurality of users 20-1 and 20-2's use of the first broadcast receiving apparatus 201. The first broadcast receiving apparatus 201 may generate the first viewing log data 61 by classifying the usage history for each of the plurality of users 20-1 and 20-2.

The first broadcast receiving apparatus 201 may generate user information 62 with respect to each of the plurality of users 20-1 and 20-2. The user information 62 may be input to the first broadcast receiving apparatus 201 by the plurality of users 20-1 and 20-2 through the remote controller 10-1 and 10-2. Although the user information 62 is not input to the first broadcast receiving apparatus 201, the user information 62 may be the result of the census of each family surveyed by external agencies.

FIG. 6 illustrates that two users are present in one family. At the time of implementation, one or three or more users may share the first broadcast receiving apparatus 201. It is illustrated that the first broadcast receiving apparatus 201 connected to the external server is one, but at the time of implementation, a server apparatus connected to an external server may include a plurality of server apparatuses.

The first broadcast receiving apparatus 201 may transmit the first viewing log data 61 with respect to the plurality of users 20-1 and 20-2 and the user information 62 to the external server (not shown) or the broadcast receiving apparatus (not shown).

The external server receiving the first viewing log data 61 and the user information 62 from the first broadcast receiving apparatus 201 may transmit the first viewing log data 61 and the user information 62 received at the server apparatus (not shown) according to an embodiment of the present disclosure.

Figure 7:
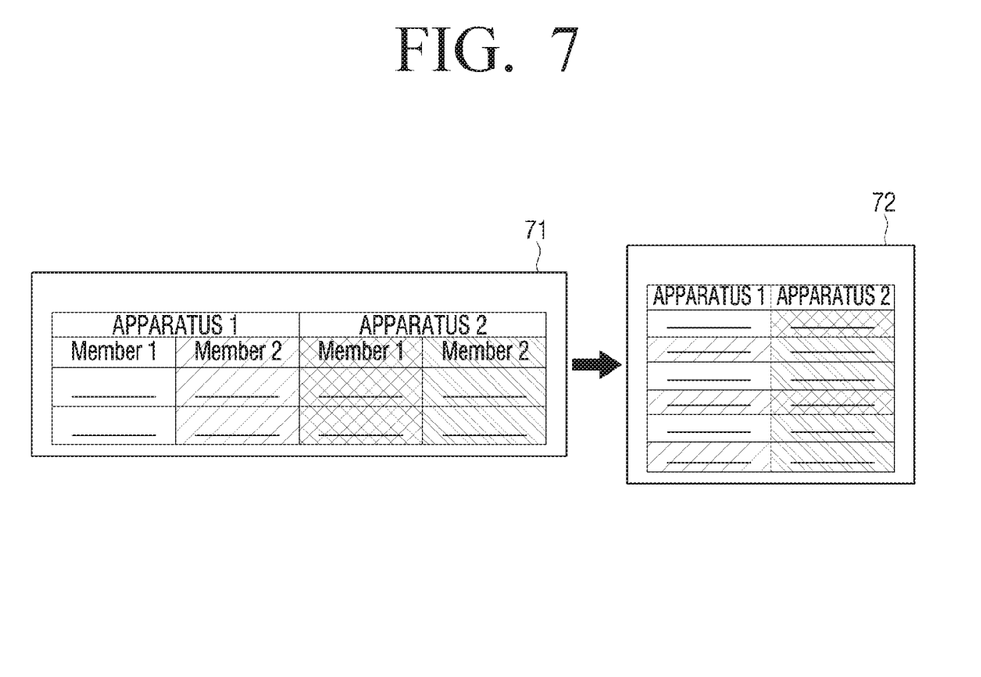
FIG. 7 is a schematic view to explain a method for arranging first viewing log data in a time sequence by first broadcast receiving apparatus according to an embodiment of the present disclosure.

FIG. 7 is a schematic view to explain a method for arranging first viewing log data in a time sequence by first broadcast receiving apparatus according to an embodiment of the present disclosure.

Referring to FIG. 7, a server apparatus may receive first viewing log data 71, which is the usage history of using a plurality of first broadcast receiving apparatuses by a plurality of first users using the plurality of first broadcast receiving apparatuses connected to an external server from the external server, arrange the received first viewing log data 71 in a time sequence, and generate the arranged first viewing log data 72. The server apparatus may store the arranged first viewing log data 72.

Although not shown, the server apparatus may receive user information on each of the plurality of first users from the external server, and the arranged first viewing log data 72 and the received user information may be data base used for renewing the predictive model for predicting the number of users using the second broadcast receiving apparatus and the user information when only the second viewing log data with respect to the second broadcast receiving apparatus is input without user information.

Figure 8:
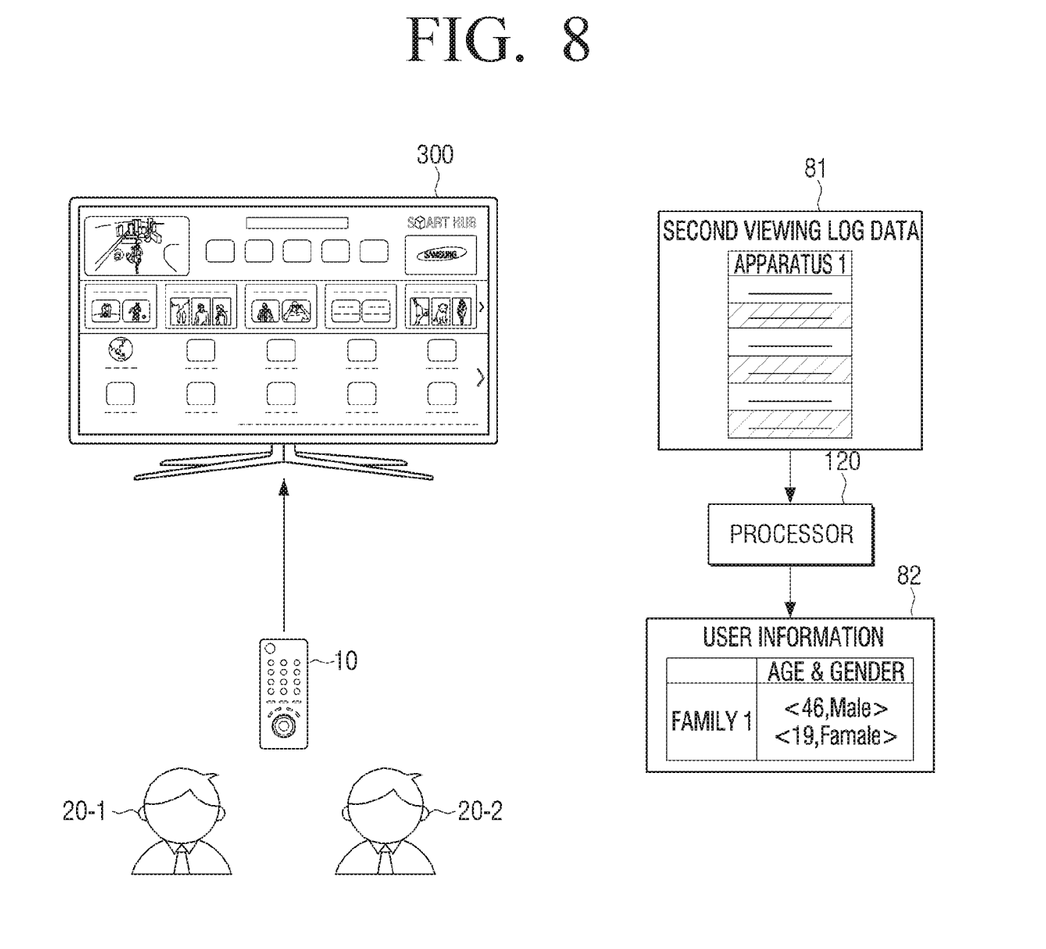
FIG. 8 is a schematic view to explain a user profiling method using second viewing log data according to an embodiment of the present disclosure.

FIG. 8 is a schematic view to explain a user profiling method using second viewing log data according to an embodiment of the present disclosure.

Referring to FIG. 8, a second broadcast receiving apparatus 300 connected to a server apparatus according to an embodiment of the present disclosure may be used by a plurality of users 20-1 and 20-2. The second broadcast receiving apparatus 300 may receive the operations of the plurality of users 20-1 and 20-2. The second broadcast receiving apparatus 300 may receive only the operation by a remote controller 10, but cannot determine whether the plurality of users 20-1 and 20-2 operate.

The server apparatus according to an embodiment of the present disclosure may receive second viewing log data 81 which is the history of using the second broadcast receiving apparatus 300 from the second broadcast receiving apparatus 300, and FIG. 8 illustrates the second viewing log data 81 to distinguish users to describe that a plurality of users use the second broadcast receiving apparatus 300. However, at the time of implementation, the second viewing log data 81 received from the second broadcast receiving apparatus 300 may be the time-ordered usage history of the second broadcast receiving apparatus 300.

The processor 120 of the server apparatus according to an embodiment of the present disclosure may predict the number of users using the second broadcast receiving apparatus 300 and user information on each user user by using the received second viewing log data 81 and the modified predictive model. The modified predictive model may be a predictive model in which machine learning is performed as shown in FIG. 4 to enable more accurate prediction.

The processor 120 of the server apparatus according to an embodiment of the present disclosure may predict the number of users using the second broadcast receiving apparatus 300 and the user information 82 of each user by using the received second viewing log data 81 and the modified predictive model. For example, the number of members of family 1 sharing the second broadcast receiving apparatus 300 and information on each member such as gender and age may be profiled.

As described above, a plurality of members using a broadcast receiving apparatus can be more accurately profiled by using viewing log data of the time-ordered usage history of a broadcast receiving apparatus and a predictive model in which machine learning is performed.

Figure 9:
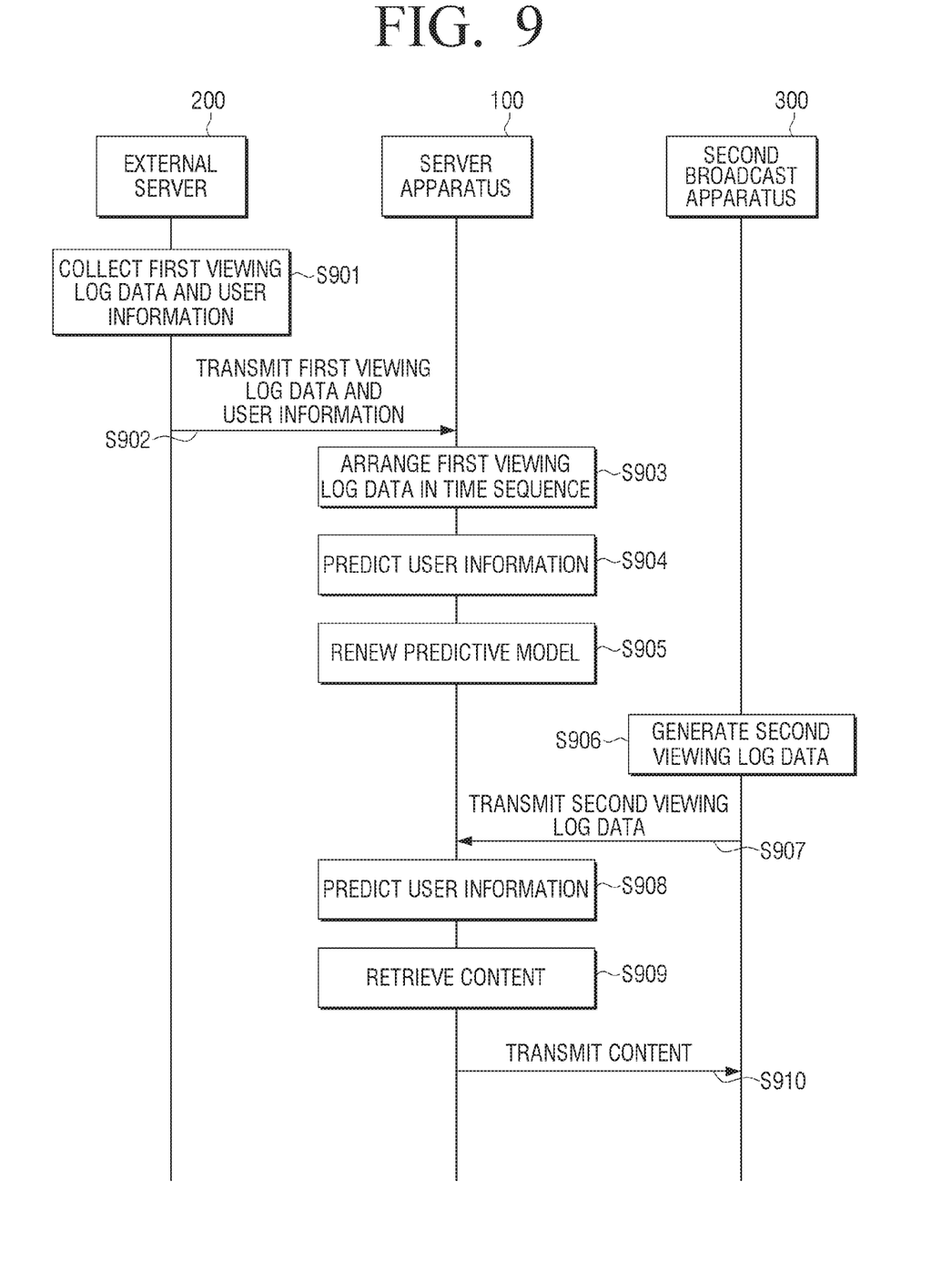
FIG. 9 is a flowchart to explain a user profiling method according to an embodiment of the present disclosure.

FIG. 9 is a flowchart to explain a user profiling method according to an embodiment of the present disclosure.

The external server 200 may collect first viewing log data and user information at step S901. To be specific, the external server 200 may collect a plurality of first viewing log data with respect to each of a plurality of users using a first broadcast receiving apparatus and user information with respect to each of the plurality of users. The collected first viewing log data may be data for each of the plurality of first users using each of the plurality of first broadcast receiving apparatuses, and each of the plurality of first receiving apparatuses to which an operation command is input such that a user uses a separate remote controller, may distinguish the first users respectively inputting the operation commands. The user information may be directly input by each of the plurality of users.

The external server 200 may transmit the collected first viewing log data and the user information to the server apparatus 100.

The server apparatus 100 receiving the first viewing log data and the use information received from the external server 200 may arrange the received first viewing log data in a time sequence at step S903. For example, when user 1 and user 2 use broadcast receiving apparatus 1, the server apparatus 100 may merge first viewing log data of user 1 and first viewing log data of user 2, and arrange the merged data in a time sequence.

The server apparatus 100 may predict the number of first users using respective first broadcast receiving apparatuses and user information on each user at step S904. To be specific, the server apparatus 100 may predict the number of users using the plurality of first broadcast receiving apparatuses and user information on each user based on the first viewing log data by using the predictive model that predicts the number of users using the broadcast receiving apparatus and user information on each user.

The server apparatus 100 may renew the predictive model based on the predicted user number and user information at step S905. Specifically, the sever apparatus 100 may compare the predicted user number and user information with user information on the plurality of first users received from the external server 200 to renew the predictive model based on the error of the predicted information. FIG. 9 illustrates that a step S904 of predicting user information and a step S905 of modifying a predictive model based thereon are performed for one time each for ease of explanation. However, at the time of implementation, the steps of predicting and renewing may be repeated several times, so that the machine training can be performed in a manner that enables more accurate prediction.

The second broadcast receiving apparatus 300 connected to the server apparatus 100 may generate second viewing log data with respect to at least one user using the second broadcast receiving apparatus 300 at step S906. The second viewing log data with respect to the second broadcast receiving apparatus 300 may be the time-ordered usage history of the second broadcast receiving apparatus 300, but the number of users, gender, age of the users using the second broadcast receiving apparatus 300 may not be identified. Meanwhile, a time when the second viewing log data with respect to the second broadcast receiving apparatus 300 is generated may be different from the operation order of the server apparatus 100.

The second broadcast receiving apparatus 300 may transmit the second viewing log data to the server apparatus 100 at step S907.

The server apparatus 100 receiving the second viewing log data for the second broadcast receiving apparatus 300 from the second broadcast receiving apparatus 300 may predict the user information on the user of the second broadcast receiving apparatus 300 by using the renewed predictive model. Although not shown, the sever apparatus 100 may transmit the predicted user information on the user of the second broadcast receiving apparatus 300 to the second broadcast receiving apparatus 300.

The server apparatus 100 may retrieve a content corresponding to at least one user based on the predicted user information on at least one user using the second broadcast receiving apparatus 300 at step S909. The server apparatus 100 may transmit the retrieved content to the second broadcast receiving apparatus 300 so that the retrieved content is displayed on the second broadcast receiving apparatus 300 at step S910.

According to various embodiments as described above, user profiling through more accurate information prediction of a plurality of users may be performed with the smaller amount of input data by repeatedly renewing the predictive model by using the first viewing log data in which a plurality of users are distinguished and user information, which are received from an external server.

The methods according to exemplary embodiments of the present disclosure may be implemented in the form of program commands that can be executed through various computer means and recorded in a computer-readable medium. The computer-readable medium may include program commands, data files, data structures, and the like, alone or in combination. For example, the computer-readable medium may be volatile storage or non-volatile storage such as ROM regardless of whether it is erasable or rewritable, a memory such as RAM, memory chip, device and integrated circuit, or a storage medium readable by a machine (e.g., a computer) as well as being optically or magnetically recordable such as CD, DVD, magnetic disk or magnetic tape. It should be understood that the memory that is included within a mobile terminal is an example of programs containing commands for embodying embodiments of the present disclosure or a machine-readable storage medium suitable for storing programs. The program commands recorded on the medium may be those specially designed and configured for the present disclosure or may be available to those skilled in the art of computer software.

Although exemplary embodiments have been shown and described, it will be appreciated by those skilled in the art that changes may be made to these exemplary embodiments without departing from the principles and spirit of the present disclosure.

Accordingly, the scope of the present disclosure is not construed as being limited to the described exemplary embodiments, but is defined by the appended claims as well as equivalents thereto.

What is claimed is:

1. A server apparatus, comprising:
   a communicator configured to receive first viewing log data for a first broadcast receiving apparatus regarding each of first users and user information for each of the first users, from an external server; and
   a processor configured to, based on the received first viewing log data and the received user information, train a predictive model to predict a number of users and user information for each user, based on viewing log data input to the predictive model,
   wherein the processor is further configured to, based on second viewing log data received from a second broadcast receiving apparatus through the communicator, input the received second viewing log data to the trained predictive model, and identify a number of users of the second broadcast receiving apparatus and user information for each of the second users based on output of the trained predictive model.

2. The server apparatus as claimed in claim 1, wherein the processor is further configured to retrieve content information corresponding to the identified number of the second users and the identified user information, and control the communicator to transmit the retrieved content information to the second broadcast receiving apparatus.

3. The server apparatus as claimed in claim 2, wherein the processor is further configured to retrieve content information corresponding to the identified user information for each of the second users, and control the communicator to transmit common content information among the retrieved content information to the second broadcast receiving apparatus.

4. The server apparatus as claimed in claim 1, wherein the processor is further configured to identify the number of the second users of the second broadcast receiving apparatus and the user information for each of the second users for each time period.

5. The server apparatus as claimed in claim 4, wherein the processor is further configured to retrieve content information corresponding to the user information identified for each time period, and control the communicator to transmit the retrieved content information to the second broadcast receiving apparatus.

6. The server apparatus as claimed in claim 1, wherein the processor is further configured to arrange the received first viewing log data in a time sequence, determine a number of the first users of the first broadcast receiving apparatus and user information for each if the first users by inputting the arranged first viewing log data to the predictive model, and modify the predictive model by comparing the received user information for each of the first users with the determined user information.

7. The server apparatus as claimed in claim 6, wherein the processor is further configured to modify the predictive model so that the determined user information approximates the received user information for each of the first users.

8. The server apparatus as claimed 1, wherein the predictive model includes at least one of a recurrent neural network, a fully connected network, or a convolutional neural network.

9. The server apparatus as claimed in claim 1, wherein the user information includes at least one of gender, age, income level, or education level of a user.

10. The server apparatus as claimed in claim 1, wherein the first viewing log data and the second viewing log data comprise at least one of a viewed channel, a channel change time, a volume control time, or a power on/off time of the server apparatus.

11. A method for controlling a server apparatus, the method comprising:
    receiving first viewing log data for a first broadcast receiving apparatus regarding each of first users and user information for each of the first users, from an external server;
    training, based on the received first viewing log data and the received user information a predictive model which outputs a number of users of a broadcast receiving apparatus and user information fir each user based on viewing log data input to the predictive model; and
    based on receiving second viewing log data for a second broadcast receiving apparatus identifying a number of second users of the second broadcast receiving apparatus and user information for each of the second users by inputting the received second viewing log data to the trained the predictive model.

12. The method as claimed in claim 11, further comprising:
    retrieving content information corresponding to the identified number of the second users and the identified user information; and
    transmitting the retrieved content information to the second broadcast receiving apparatus.

13. The method as claimed in claim 12, wherein the retrieving comprises retrieving content information corresponding to the identified user information for each of the second users, and wherein the transmitting comprises transmitting common content information among the retrieved content information to the second broadcast receiving apparatus.

14. The method as claimed in claim 11, wherein the identifying comprises identifying the number of the second users of the second broadcast receiving apparatus and the user information for each of the second users for each time period, retrieving content information corresponding to the user information identified for each time period, and transmitting the retrieved content information to the second broadcast receiving apparatus.

15. The method as claimed in claim 11, wherein the training comprises:
- arranging the received first viewing log data in a time sequence;
- determining a number of the first users of the first broadcast receiving apparatus and user information for each of the first users by inputting the arranged first viewing log data to the predictive model; and
- modifying the predictive model by comparing the received user information for each of the first users with the determined user information.

\* \* \* \* \*